United States Patent [19]

Ozawa

[11] Patent Number: 5,296,555
[45] Date of Patent: Mar. 22, 1994

[54] RUBBER COMPOSITION OF STRONG ADHESION TO METAL AND HOSE STRUCTURE USING THE SAME

[75] Inventor: Osamu Ozawa, Hiratsuka, Japan

[73] Assignee: The Yokohama Rubber Co., Ltd., Japan

[21] Appl. No.: 90,442

[22] Filed: May 27, 1993

Related U.S. Application Data

[63] Continuation of Ser. No. 537,777, Jun. 13, 1990, abandoned.

[30] Foreign Application Priority Data

Jun. 28, 1989 [JP] Japan .................................. 1-166169

[51] Int. Cl.$^5$ ..................... C08F 04/34; C08F 267/08; F16L 11/04
[52] U.S. Cl. .................................. 525/263; 525/261; 525/281; 525/350; 525/352; 138/126; 138/137
[58] Field of Search ............... 525/261, 263, 281, 350, 525/352; 138/126, 137

[56] References Cited

U.S. PATENT DOCUMENTS

| | | | |
|---|---|---|---|
| 3,972,757 | 8/1976 | Derderian et al. | 138/125 |
| 4,238,260 | 12/1980 | Washkewicz | 138/130 |
| 4,826,925 | 5/1989 | Ozawa et al. | 525/331.8 |
| 4,968,753 | 11/1990 | Oyama et al. | 525/281 |

FOREIGN PATENT DOCUMENTS 60-86135 5/1985 Japan.
62-104864 5/1987 Japan.

*Primary Examiner*—Vasu S. Jagannathan
*Attorney, Agent, or Firm*—Finnegan, Henderson, Farabow, Garrett & Dunner

[57] ABSTRACT

Rubber compositions are disclosed which are tailored to exhibit high adhesion to brass, sufficient resistance to heat and to oil and great elasticity. A selected class of highly hydrogenated acrylonitrile copolymer rubbers are blended with specified amounts of a selected class of trially isocyanurate compounds, organic sulfur-containing compounds or sulfur donors and organic peroxides. Also disclosed is a hose built with an inner tube formed from the above rubber composition and a reinforcing layer from a pressure-resistant, metallic wire plated with brass.

5 Claims, 4 Drawing Sheets

RUBBER COMPOSITION OF STRONG ADHESION TO METAL AND HOSE STRUCTURE USING THE SAME

This application is a continuation of application Ser. No. 07/537,777 filed Jun. 13, 1990, now abandoned.

TECHNICAL FIELD

This invention relates to rubber compositions for use in the formation fo rubber-metal composite products of high resistance to heat and to oil. The invention is further directed to heavy-dury hoses constructed with an inner tube formed from such a rubber composition and a layer of reinforcement from a metallic wire.

PRIOR ART

A variety of rubber products such as hoses, tires, belts, rubber rolls, molded goods and the like have been used usually under oil-staining, high-temperature and high-pressure conditions for long periods of time. In such instances sharp degradation of base rubbers has a deteriorative impact on the respective systems of operation, entailing laborious maintenance and replacement, and will sometimes cause serious hazards.

Numerous rubbers are reputed for their good resistance to both heat and oil at a working temperature generally of 120° to 150° C. Those rubbers are typified by acrylonitrile-butadiene rubber, acryl rubber, ethylene-acrylic rubber, ethylene-acrylic-vinyl acetate rubber, chlorosulfonated polyethylene rubber and chlorinated polyethylene rubber and also different acrylonitrile-butadiene rubbers reformed to have a conjugated diene unit hydrogenated. The hydrogenated rubbers are hereunder called "H-NRBs" for brevity.

Rubber compositions are receptive to cure either with a sulfur material or with an organic peroxide. Peroxide-curable rubbers are more resistant to heat than sulfur-curable counterparts. The term cure used herein is construed as equivalent in meaning to vulcanization.

Certain H-NBRs among the above acrylonitrile-based rubbers have been found highly heat- and oil-resistant. They are termed highly hydrogenated acrylonitrile-butadiene rubbers, abbreviated as "highly saturated H-NBRs", in which the conjugated diene unit is hydrogenated at a great level. H-NBRs are by nature requisite of organic peroxide curing.

Peroxide-curable, highly saturated H-NBRs are disadvantageous in that they are not sufficiently adhesive, due to sulfur being absent in the reaction system, to metals such as brass and the like; that is, rubber products of highly saturated H-NBR and brass upon exposure to high temperature and pressure conditions tend to invite interlaminar separation between the rubber and the metal, resulting in structural failure. This is noted particularly true of a hose constructed with an inner tube of a highly saturated H-NBR rubber and a reinforcing layer of a brass-plated steel wire. Such type of hose, if subject to repetitive bending, negative pressure or great flow velocity, is liable to delaminate at between the rubbery tube and the wiry layer. The reason is that because of poor adhesion peculiar to highly saturated H-NBRs, the inner tube is not adequately bondable to the steel wire. Clamping of a metal fitting will then lead to bulged, and sometimes, bursted hose.

It has been proposed as disclosed in Japanese Patent Laid-Open Publication No. 62-104864 that peroxide-curable H-NBR be blended with an organic sulfur-containing compound to thereby attain good adhesion to brass. Rubber compositions when cured with an organic peroxide can be improved with respect to the physical qualities, as is known in the art, by admixing 100 parts by weight of a base rubber with a minor proportion of 1 to 4 parts by weight of a curing aid such as triallyl isocyanurate, trimethylolpropane trimethacrylate, diallyl phthalate or the like.

Japanese Patent Laid-Open Publication No. 60-86135 teaches the use of a similar curing aid in an amount of 8 to 30 parts by weight based on 100 parts by weight of H-NBR so as to improve steam resistance of the ultimate composition.

The rubber composition of the first-mentioned publication, however, leaves the problem that it will get insufficiently crosslinked owing to interaction between the peroxide and the sulfur-containing compound, leading to lower stress such for example as a modulus at 100% elongation than a rubber mix omitting an organic sulfur-containing compound. Such prior composition has been found, when used for a high-pressure hose assembled with a coupler, objectionably leaky of an oily fluid in the vicinity of the coupler due to intense forces internally applied to the hose. This problem is left unsolved despite attempts made with a peroxide-curable rubber/curing aid mix proposed above.

SUMMARY OF THE INVENTION

The present invention therefore has for its primary object to overcome the foregoing difficulties of the prior art.

More specifically, the invention seeks to provide a new rubber composition which is highly brass-adhesive, sufficiently heat- and oil-resistant and adequately elastic. The invention further seeks to provide a hose structure for heavy-duty use which is built with an inner tube of such an adhesive rubber composition and a reinforcing layer of a pressure-resistant, metallic wire plated with brass.

The rubber composition according to the invention is also applicable to the formation of rubber-brass composite structures such as tires, rubber rolls, belts, molded goods and the like.

The above and other objects and advantages of the invention will become readily understood from the following description upon reading in conjunction with the accompanying drawings.

One aspect of the invention provides a rubber composition comprising (I) 100 parts by weight of a base rubber comprising at least one copolymer having in the molecular chain an unsaturated acrylonitrile unit in an amount of from 10 to 45 percent by weight, a conjugated diene unit up to 20 percent by weight and either one or both of an unsaturated ethylenic monomer unit other than the unsaturated acrylonitrile unit and a hydrogenated conjugated diene unit in amount of from 35 to 90 percent by weight, (II) 5 to 30 parts by weight of a triallyl isocyanurate compound, (III) 0.1 to 15 parts by weight of an organic sulfur-containing compound and (IV) 1 to 15 parts by weight of an organic peroxide.

Another aspect of the invention provides a hose structure comprising an inner tube of a single or multiple layer and a reinforcing layer laid thereover, the inner tube being formed from the rubber composition according to the first aspect of the invention, and the reinforcing layer being formed from a metallic wire of high pressure resistance plated with a copper-zinc alloy.

DETAILED DESCRIPTION OF THE INVENTION

Figure 1:
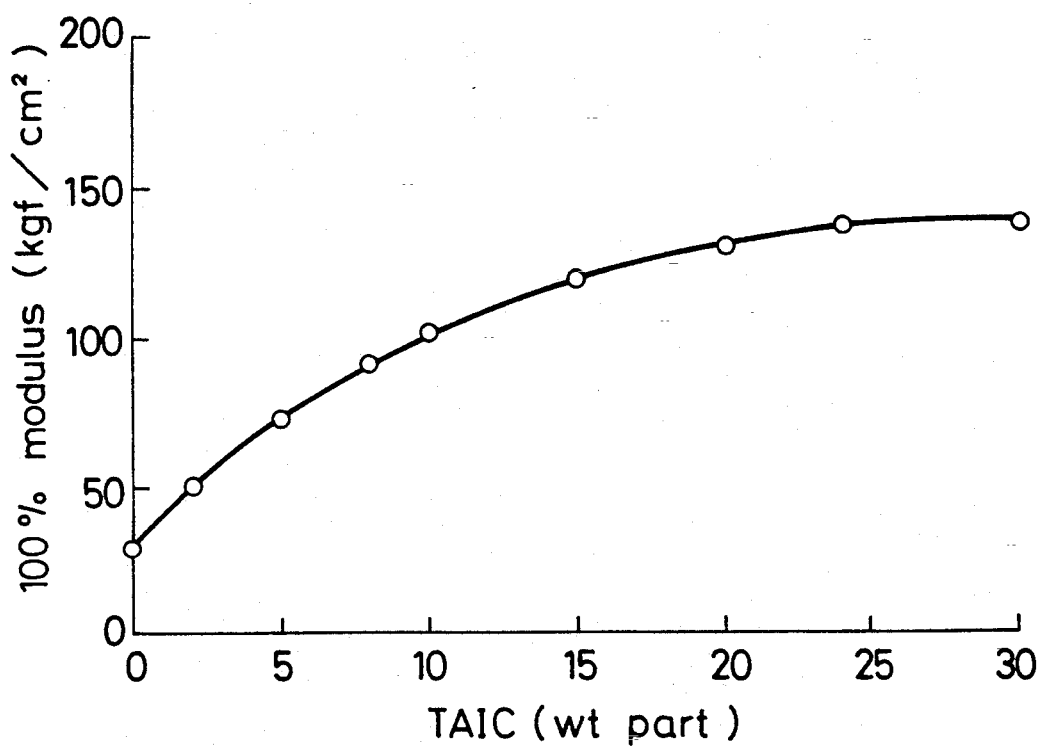
FIGS. 1 through 4 each are graphic representations, FIG. 1 being directed to the 100% modulus of a cured rubber composition plotted against the amount of a triallyl isocyanurate, FIG. 2 to the bondability of a cured rubber composition to brass plotted against the amount of a triallyl isocyanurate, FIG. 3 to the 100% modulus of a cured rubber composition plotted against the amount of an organic sulfur-containing compound and FIG. 4 to the adhesion of a cured rubber composition to brass plotted against the amount of an organic sulfur-containing compound.
Figure 2:
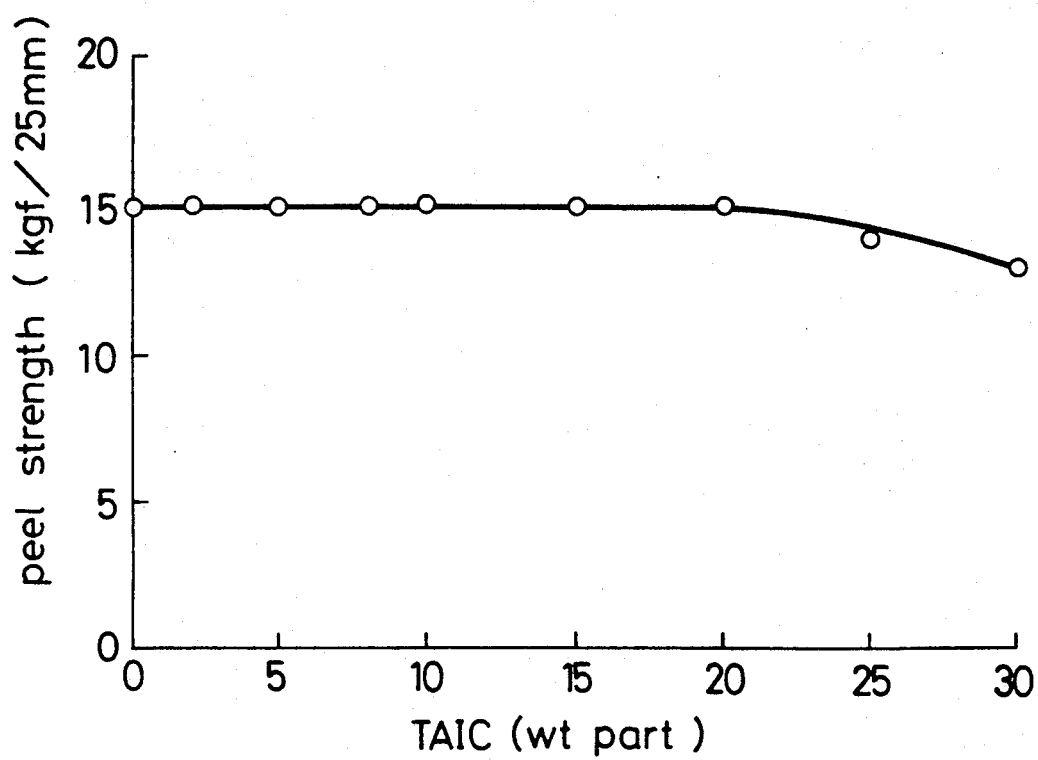

Rubber compositions, provided in accordance with a first embodiment of the present invention, are made up essentially of (I) a base rubber, (II) a triallyl isocyanurate, (III) an organic sulfur-containing compound and (IV) an organic peroxide, each such component being described later.

Component I eligible as a base rubber for purposes of the invention is an acrylonitrile copolymer which is hydrogenic in nature and resistant to heat and to oil. The copolymer is composed of 10 to 45% by weight of an acrylonitrile unit, 0 to 20% by weight of a conjugated diene unit and 35 to 90% by weight of an unsaturated ethylenic monomer unit other than the unsaturated acrylonitrile unit and/or a hydrogenated conjugated diene unit. To be more specific, an acrylonitrile unit (ACN), a carbon-carbon bond unit (—C=C—) and a saturated methylene unit (—C—C—) are present in the copolymer molecule.

The ACN unit has the formula of

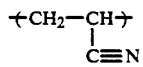

and should range in content from 10 to 45% by weight. Less than 10% would not be effective to improve oil resistance, and more than 45% would be responsible for inadequate quality at low temperature.

The —C=C— unit is a conjugated diene unit of the formula $+CH_2—CH=CH—CH_2+$ and should be in a content of smaller than 20% by weight. Greater contents would lead to reduced resistance to degraded oil.

The —C—C— unit is an unsaturated ethylenic monomer unit other than the ACN unit or a hydrogenated conjugated diene unit or both. The methylene unit is represented by the formula $+CH_2—CH_2+$ and should be contained in the copolymeric rubber in an amount of 35 to 90% by weight. Methylene units if more than 90%, hence less acrylonitrile units, would be sensitive to attack by oil and if less than 35%, hence more nitrile units, would adversely affect cold resistance. Methylene units not exceeding 35%, in the case of reduced acrylonitrile units and increased double carbon units, would make the finished rubber less proof to degraded oil. To further improve resistance to that oil, the methylene unit may preferably be hydrogenated in as a high ratio as of 95% or even greater.

Component I typically includes hydrogenates of acrylonitrile-butadiene rubber, acrylonitrile-isoprene rubber, acrylonitrile-butadiene-isoprene rubber and the like, acrylonitrile-butadiene-methyl acrylate rubber, acrylonitrile-butadiene-acrylate rubber and the like and their hydrogenates, acrylonitrile-ethylene-butadiene rubber, acrylonitrile-butyl acrylate-ethoxyethyl acrylate-vinyl chloroacetate rubber, acrylonitrile-butyl acrylate-ethoxyethyl acrylate-vinyl norbornene rubber and the like and their hydrogenates. These rubbers may be used alone or in combination and blended if necessary with any other suitable rubber.

Component II is a triallyl isocyanurate (TAIC) compound of the formula

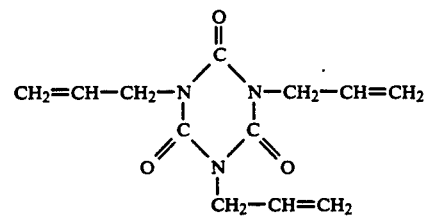

TAIC acts as an elasticity improver such as of a modulus at 100% without marring bondability of the ultimate rubber mix. To implement the invention, such compound is required to be used in a relatively major proportion compared to the case where it is added as a so-called curing aid. The amount of component II, TAIC, should range from 5 weight, per 100 parts by weight of component I or base rubber. Less than 5 parts would show no appreciable rise in elasticity, and more than 30 parts would not be economically feasible. Excess TAIC should be avoided to preclude quality deterioration in respect of aging by heat and by oil. Component II may conveniently be varied in amount within the above specified range with the amount of component III described later.

Component III is typical of an organic sulfur-containing compound, 6-R-2,4-dimercapto-1,3,5-triazine, of the formula

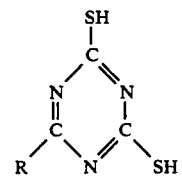

where R is a mercapto, alkoxy, mono- or di-alkylamino, mono- or di-cycloalkylamino, mono- or di-arylamino, or N-alkyl-N'-arylamino group. Trimercapto-1,3,5-triazine is particularly preferred. This component contributes greatly to improvement in the resultant rubber mix bonding to a brass alloy.

In addition to those triazine compounds, sulfur donors in common use may be incorporated as component III. The donor is a compound capable of separating sulfur in active form during curing and hence serving as a curing agent. Included in specific examples are thiuram disulfides of the formula $(R_2NCS)_2S_2$ where R is represented by a hydrogen atom or an alkyl group, and two alkyl groups may be linked for ring formation, such as tetramethylthiuram disulfide, tetraethylthiuram disulfide, dipentamethylenethiuram disulfide and the like, thiuram tetrasulfides of the formula $(R_2NCS)_2S_4$ where R is as defined above, such as dipentamethylenethiuram tetrasulfide and the like and morpholine derivatives such as 4,4'-dithiomorpholine, dimorpholine disulfide, 2-(4-morpholinodithio)benzothiazole and the like.

Component III should range in amount from 0.1 to 15 parts by weight, preferably from 0.1 to 10 parts by weight, per 100 parts by weight of component I. Less than 0.1 part would produce a rubber mix of too low adhesion to brass, whereas more than 15 parts would only be uneconomical without further improvement in brass bonding.

Component IV is an organic peroxide as a curing agent. Suitable organic peroxides include such that do not induce sudden crosslinking at a given cure temperature. Preferred are dialkyl peroxides of 10 hours in half life and 80° C. or higher in decomposition temperature, and they may be chosen for example from dicumyl peroxide, 1,3-bis(t-butylperoxyisopropyl)benzene, 4,4-di-t-butylperoxy-n-butyl valerate and the like. Component IV should be added in an amount of 1 to 15 parts by weight, in terms of its net peroxide content, based on 100 parts by weight of component I. Smaller amounts would fail to gain adequate curing, and greater amounts would develop residual peroxide and thus make the final vulcanizate objectionably oxidative with heat.

Various other additives may be employed which are selected from fillers, reinforcers, plasticizers, antioxidants and the like.

Hose structures, contemplated under a second embodiment of the invention, are built essentially with an inner tube and a reinforcing layer laid thereover. Importantly, the inner tube should be formed from a selected rubber composition specified in connection with the first embodiment. The layer of reinforcement may be constituted from a pressure-resistant wire of high-carbon steel or of other suitable metal plated with a copper-zinc alloy or brass and disposed over the inner tube as by braiding or spiral winding.

The hose of the invention may be produced in conventional manner by extruding a given rubber composition onto a mandrel to thereby form an inner tube and subsequently by braiding or winding a given wire around the tube, followed by press-, steam- or hot water-curing usually at from 130° to 200° C. and by pulling of the mandrel out of the vulcanizate.

Where it is found desirable, an outer cover may be disposed around the reinforcement. Rubbers useful in the cover are not specifically restrictive but firmly bondable to the wiry material, and they include for example chloroprene rubber, chlorosulfonated rubber, chlorinated polyethylene rubber and the like. The inner tube may be formed in a multi-layered structure to suit a particular application.

The rubber composition of the invention, because of its strong adhesion to brass, may be cured together with brass parts into an integral structure after which numerous composite products are obtained. By the brass parts are meant reinforcing materials for use in hoses and tires in particular. The brass part is generally in the shape of a wire, pipe, plate or sheet and may be of a brass-plated type.

EXAMPLES

The present invention will now be described by way of the following examples which are provided for illustrative purposes. In these examples all recipes are given by weight part per 100 parts by weight of rubber.

Different rubber compositions were prepared as shown in Tables 1 to 3 and different hose structures also produced. Performance evaluation was made of all the compositions and hoses under the conditions indicated below and with the results tabulated along with the recipes.

Elasticity (100% Modulus)

A test composition was mixed by a mixing roll at 60° C. for 15 min, followed by sheeting to a thickness of 2.0 mm on a laboratory roll. Press curing was effected on a laboratory press at 30 kgf/cm$^2$ in surface pressure and at 160° C. for 60 min. The sheet rubber thus cured was elongated at 500 mm/min from which a modulus at 100% elongation was determined.

Used were the method, tester and other details stipulated by JIS K-6301.

Adhesion to Brass

Figure 5:
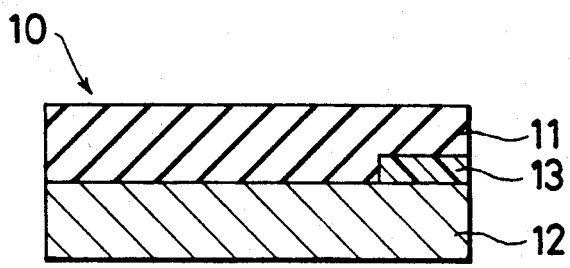
FIG. 5 is a schematic view, seen in cross section, of a test laminate formed to determine rubber-to-brass adhesion.

After being mixed by a mixing roll at 60° C. for 15 min, a test composition was sheeted to a thickness of 2.5 mm on a laboratory roll. A laminate, illustrated at 10 in FIG. 5, was formed by superimposing a sheet rubber 11 on a brass plate 12 with a cellophane sheet 13 partly interposed therebetween for grip when in peeling. On a laboratory press the laminate was press-cured into an integral structure at 30 kgf/cm$^2$ and at 160° C. for 60 min after which it was allowed to stand at room temperature for 24 hr and cut to a width of 2.54 cm for adhesion testing.

JIS K-6301 was followed in measuring peel strength while the rubber 11 was forcibly delaminated from the plate 12 at an angle of 90° with respect to a plane direction and at a speed of 50 mm/min.

After-peel appearance was also inspected and graded. In Tables 1 to 3 the symbol "o" is taken as "rubber-fractured" and "x" as "interlaminar-separated between rubber and brass".

Hose Production and Oil Aging

Onto a nylon mandrel was extruded a test composition to an inside diameter of 9.5 mm and to a thickness of 1.8 mm by means of a crosshead extruder, thereby forming an inner tube. Braided over the inner tube was a pressure-resistant steel wire of 0.31 mm in diameter plated with brass. An outer cover was disposed over the braiding by extruding a chloroprene rubber mix to an inside diameter of 18.0 mm. The green hose after being ribbon-wrapped was cured in a vulcanizing can at 160° C. for 90 min, followed by removal of the wrapper and by subsequent stripping of the mandrel.

The resultant hose was provided at both ends with a metal fitting and then filled with a hydraulic oil (White Parrot S-3, Showa Shell Oil Co.). Aging was done at 150° C. for 72 hr. The hose was freed from the oil and examined for bulging and leakage.

Bulging

Failures such as bulges and cuts of the inner tube were inspected at or near to a hose portion to which the coupler had been attached. The symbol "o" stands for "not bulged" an "x" for "bulged".

Leakage

A hose adjudged as free from bulging was held for 5 min at a pressure of 240 kgf/cm$^2$. Leak, detachment or rupture was inspected and graded by the symbol "o" as "not leaked" and "x" as "leaked". None of the test hoses caused detachment or rupture.

Table 1 demonstrates the test data resulting from the use of different curing aids.

TAIC, Example 1 representing the invention, has proved notably great in 100% modulus or elasticity in contrast to a curing aid-free control of Comparative Example 1. TAIC is also satisfactory in respect of adhesion to brass. Performance was not determinable in the case of Acryl Ester TMP (trimethylolpropane trimethacrylate), Comparative Example 2, as the rubber composition was acceleratively susceptible to auto curing and hence scorching in the presence of organic peroxide in a mixing stage. As is apparent from Comparative Example 3, Daiso Dap Monomer (diallyl phthalate) was only effective for a slight rise in elasticity. TAIC has now been found conducive to leak proofness after oil aging.

Table 2 shows the results of varying amounts of TAIC. The more the compound is, the greater elasticity as is evident from Table 2 and FIG. 1. This benefit is conspicuous in a TAIC amount of 5 to 20 parts as are in Examples 1 and 2 to 6. At more than 25 parts elasticity becomes almost saturated as appears clear from Examples 6 and 7 and also from FIG. 1. Examples 1 and 2 to 7 and Comparative Example 4 are substantially comparable in brass bonding to one another irrespective of the amounts of TAIC. Comparative Example 4 using TAIC in too low an amount revealed leak after oil aging.

Figure 3:
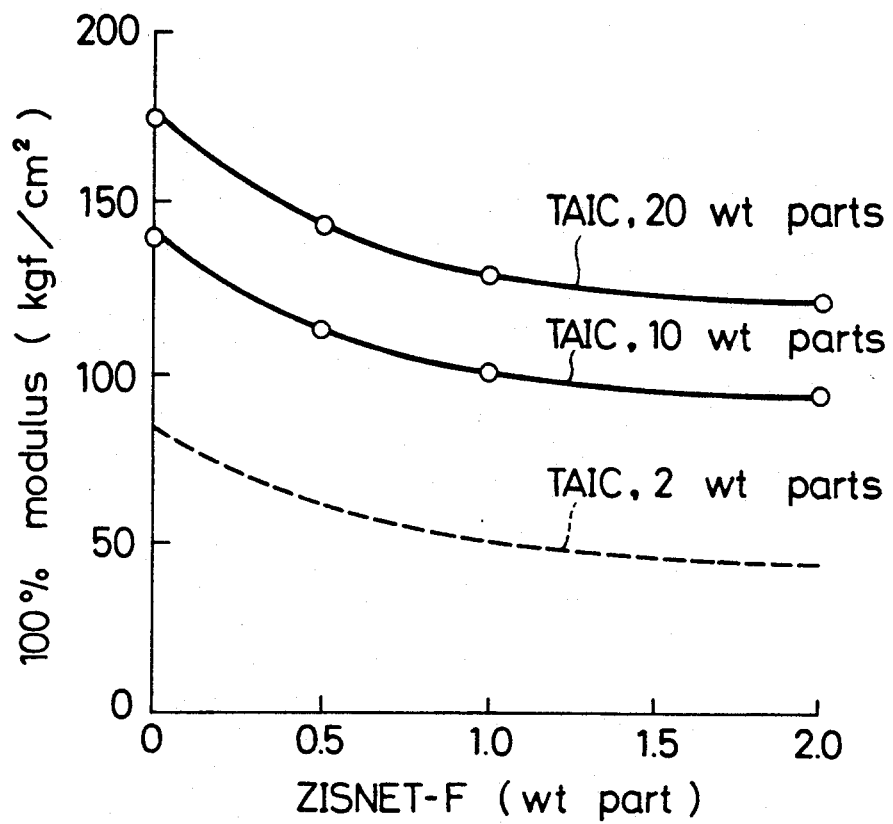

In Table 3 there are shown the results obtained with an organic sulfur-containing ZISNET-F compound varied in amount. The addition of ZISNET-F, Examples 1 and 8 to 11, have been proved to invite a slight decline in elasticity, as seen from FIG. 3 taken in connection with Table 3, as compared to the absence of that compound in Comparative Examples 5 and 6. This decline, however, is to an extent to suit practical purposes in respect of brass bonding and leak proofness as is clear from Table 3.

Figure 4:
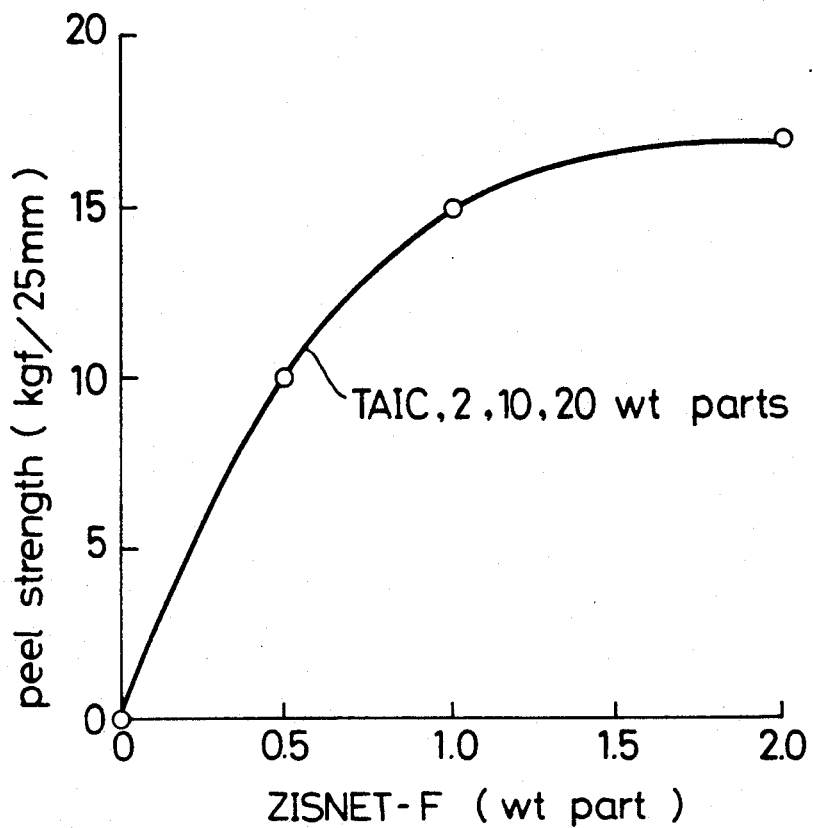

Table 3 and FIG. 4 have confirmed that adhesion to brass improves with the increase in the amount of ZISNET-F, evidencing that despite the presence of TAIC within the scope of the invention, the omission of ZISNET-F fails to bond to brass and hence leads to bulging after oil aging. Leak testing was impossible in Comparative Examples 5 and 6.

To attain enhanced brass bonding and elastic modulus characteristics, both of selected isocyanurate and sulfur-containing compounds are key components for blending with a selected class of high H-NBR rubbers.

Listed below are details of certain materials shown in Tables 1 to 3.

Asahi No. 50
SFR carbon black, Asahi Carbon Co.
Vulkanox DOA
diphenylamine derivatice, Bayer AG
Vulkanox ZMB-2
4,5-methylmercaptobenzimidazole zinc salt, Bayer AG
Wax PE 520
wax, Hoechst AG
TAIC
trially isocyanurate, Nippon Kasei Co.
Acryl Ester TMP
trimethylolpropane trimethacrylate, Mitsubishi Rayon Co.
Daiso Dap Monomer
diallyl phthalate, Osaka Soda Co.
Perkadox 14/40
1,3-bis(t-butylperoxyisopropyl)benzene, Kakayu Akzo Co.
ZINSET-F
2,4,6-trimercapto-1,3,5-triazine, Sankyo Kasei Co.

TABLE 1

| Formulations/Properties | Comparative Example 1 | Example 1 | Comparative Example 2 | Comparative Example 3 |
| --- | --- | --- | --- | --- |
| polymer | 100 | 100 | 100 | 100 |
| ACN: 33 wt % | | | | |
| C=C: 1.3 wt % | | | | |
| C—C: 65.7 wt % | | | | |
| SRF, Asahi No. 50 | 95 | 95 | 95 | 95 |
| zinc oxide | 2 | 2 | 2 | 2 |
| stearic acid | 1 | 1 | 1 | 1 |
| Vulkanox DDA | 1.5 | 1.5 | 1.5 | 1.5 |
| Vulkanox ZMB-2 | 1.5 | 1.5 | 1.5 | 1.5 |
| Wax PE 520 | 1 | 1 | 1 | 1 |
| TAIC | — | 10 | — | — |
| Acryl Ester TMP | — | — | 10 | — |
| Daiso Dap Monomer | — | — | — | 10 |
| Perkadox 14/40 | 7.5 | 7.5 | 7.5 | 7.5 |
| ZISNET-F | 1 | 1 | 1 | 1 |
| 100% modulus | 32 | 102 | — | 40 |
| adhesion to brass | | | | |
| peel strength (kgf/25 mm) | 15 | 15 | | 14 |
| appearance | o | o | | o |
| hose after oil aging | | | | |
| bulging | o | o | | o |
| leakage | x | o | | x |

TABLE 2

| Formulations/Properties | Comparative Example 4 | Examples 2 | 3 | 1 | 4 | 5 | 6 | 7 |
| --- | --- | --- | --- | --- | --- | --- | --- | --- |
| polymer | 100 | 100 | 100 | 100 | 100 | 100 | 100 | 100 |
| ACN: 33 wt % | | | | | | | | |
| C=C: 1.3 wt % | | | | | | | | |
| C—C: 65.7 wt % | | | | | | | | |
| SRF, Asahi No. 50 | 95 | 95 | 95 | 95 | 95 | 95 | 95 | 95 |
| zinc oxide | 2 | 2 | 2 | 2 | 2 | 2 | 2 | 2 |
| stearic acid | 1 | 1 | 1 | 1 | 1 | 1 | 1 | 1 |
| Vulkanox DDA | 1.5 | 1.5 | 1.5 | 1.5 | 1.5 | 1.5 | 1.5 | 1.5 |

TABLE 2-continued

| Formulations/Properties | Comparative Example 4 | Examples 2 | 3 | 1 | 4 | 5 | 6 | 7 |
|---|---|---|---|---|---|---|---|---|
| Vulkanox ZMB-2 | 1.5 | 1.5 | 1.5 | 1.5 | 1.5 | 1.5 | 1.5 | 1.5 |
| Wax PE 520 | 1 | 1 | 1 | 1 | 1 | 1 | 1 | 1 |
| TAIC | 2 | 5 | 8 | 10 | 15 | 20 | 25 | 30 |
| Perkadox 14/40 | 7.5 | 7.5 | 7.5 | 7.5 | 7.5 | 7.5 | 7.5 | 7.5 |
| ZISNET-F | 1 | 1 | 1 | 1 | 1 | 1 | 1 | 1 |
| 100% modulus | 51 | 73 | 91 | 102 | 119 | 130 | 137 | 139 |
| adhesion to brass | | | | | | | | |
| peel strength (kgf/25 mm) | 15 | 15 | 15 | 15 | 15 | 15 | 14 | 13 |
| appearance | o | o | o | o | o | o | o | o |
| hose after oil aging | | | | | | | | |
| bulging | o | o | o | o | o | o | o | o |
| leakage | x | o | o | o | o | o | o | o |

TABLE 3

| Formulations/Properties | Comparative Example 5 | Examples 8 | 1 | 9 | Comparative Example 6 | Examples 10 | 5 | 11 |
|---|---|---|---|---|---|---|---|---|
| polymer | 100 | 100 | 100 | 100 | 100 | 100 | 100 | 100 |
| ACN: 33 wt % | | | | | | | | |
| C=C: 1.3 wt % | | | | | | | | |
| C—C: 65.7 wt % | | | | | | | | |
| SRF, Asahi No. 50 | 95 | 95 | 95 | 95 | 95 | 95 | 95 | 95 |
| zinc oxide | 2 | 2 | 2 | 2 | 2 | 2 | 2 | 2 |
| stearic acid | 1 | 1 | 1 | 1 | 1 | 1 | 1 | 1 |
| Vulkanox DDA | 1.5 | 1.5 | 1.5 | 1.5 | 1.5 | 1.5 | 1.5 | 1.5 |
| Vulkanox ZMB-2 | 1.5 | 1.5 | 1.5 | 1.5 | 1.5 | 1.5 | 1.5 | 1.5 |
| Wax PE 520 | 1 | 1 | 1 | 1 | 1 | 1 | 1 | 1 |
| TAIC | 10 | 10 | 10 | 10 | 20 | 20 | 20 | 20 |
| Perkadox 14/40 | 7.5 | 7.5 | 7.5 | 7.5 | 7.5 | 7.5 | 7.5 | 7.5 |
| ZISNET-F | — | 0.5 | 1 | 2 | — | 0.5 | 1 | 2 |
| 100% modulus | 141 | 113 | 102 | 92 | 175 | 144 | 130 | 123 |
| adhesion to brass | | | | | | | | |
| peel strength (kgf/25 mm) | 0 | 10 | 15 | 17 | 0 | 10 | 15 | 17 |
| appearance | x | o | o | c | x | o | o | o |
| hose after oil aging | | | | | | | | |
| bulging | x | o | o | o | x | o | o | o |
| leakage | — | o | o | o | — | o | o | o |

What is claimed is:

1. A rubber composition comprising:
(I) 100 parts by weight of a base rubber comprising at least one copolymer which is (a) a hydrogenate of acrylonitrile-butadiene rubber, acrylonitrile-isoprene rubber or acrylonitrile-butadiene-isoprene rubber, (b) acrylonitrile-butadiene-methyl acrylate rubber, acrylonitrile-butadiene-acrylate rubber or a hydrogenate thereof, or (c) acrylonitrile-ethylene-butadiene rubber, acrylonitrile-butyl acrylate-ethoxyethyl acrylate-vinyl chloroacetate rubber or acrylonitrile-butyl acrylate-ethyoxyethyl acrylate-vinyl norborene rubber or a hydrogenate thereof;
(II) 5 to 30 parts by weight of a triallyl isocyanurate compound of the formula:

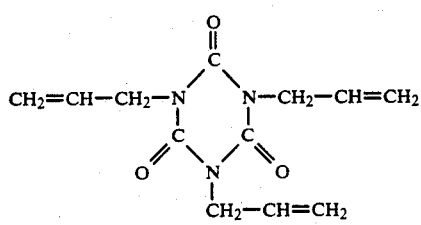

(III) 0.1 to 15 parts by weight of a 6-R-2,4-dimercapto-1,3,5-triazine compound of the formula:

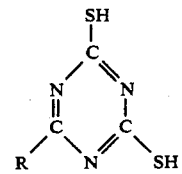

where R is a mercapto, alkoxy, mono- or di-alkylamino, mono- or di-cycloalkylamino, mono- or di-arylamino or N-alkyl-N'-arylamino group; and
(IV) 1 to 15 parts by weight of an organic peroxide.

2. The composition of claim 1 wherein component IV is dicumyl peroxide, 1,3-bis(t-butylperoxyisopropyl)-benzene or 4,4-di-t-butylperoxy-n-butyl valerate.

3. A hose structure comprising an inner tube of a single or multiple layer and a reinforcing layer laid thereover, the inner tube being formed from a rubber composition comprising:
(I) 100 parts by weight of a base rubber comprising at least one copolymer which is (a) a hydrogenate of acrylonitrile-butadiene rubber, acrylonitrile-isoprene rubber or acrylonitrile-butadiene-isoprene rubber, (b) acrylonitrile-butadiene-methyl acrylate rubber or acrylonitrile-butadiene-acrylate rubber or a hydrogenate thereof, or (c) acrylonitrile-ethylene-butadiene rubber, acrylonitrile-butyl acrylate-ethoxyethyl acrylate-vinyl chloroacetate rubber, or acrylonitrile-butyl acrylate-ethoxyethyl acrylate-vinyl norborene rubber or a hydrogenate thereof;

(II) 5 to 30 parts by weight of a triallyl isocyanurate compound of the formula:

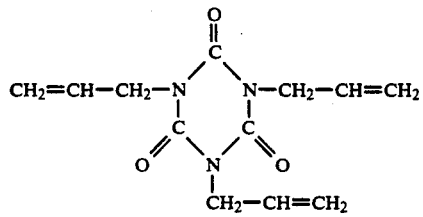

(III) 0.1 to 15 parts by weight of a 6-R-2,4-dimercapto-1,3,5-triazine compound of the formula:

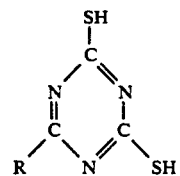

where R is a mercapto, alkoxy, mono- or di-alkylamino, mono- or di-cycloalkylamino, mono- or di-arylamino or N-alkyl-N'-arylamino group; and (IV) 1 to 15 parts by weight of an organic peroxide; and the reinforcing layer being formed from a metallic wire of high pressure resistance plated with a copper-zinc alloy.

4. The hose structure of claim 3 further including an outer cover disposed peripherally over the reinforcing layer.

5. The hose structure of claim 4 wherein the outer cover is formed of chloroprene rubber, chlorosulfonated rubber or chlorinated polyethylene rubber.

* * * * *